(12) United States Patent
Kue

(10) Patent No.: US 7,983,255 B2
(45) Date of Patent: Jul. 19, 2011

(54) USING Q-IN-Q-IN-Q TO IMPLEMENT ETHERNET SERVICE UNIT RING

(75) Inventor: Zenon Kue, San Jose, CA (US)

(73) Assignee: Avaya Inc., Basking Ridge, NJ (US)

( * ) Notice: Subject to any disclaimer, the term of this patent is extended or adjusted under 35 U.S.C. 154(b) by 412 days.

(21) Appl. No.: 12/002,745

(22) Filed: Dec. 17, 2007

(65) Prior Publication Data

US 2009/0154470 A1 Jun. 18, 2009

(51) Int. Cl.
*H04L 12/28* (2006.01)
(52) U.S. Cl. ........................................................ 370/389
(58) Field of Classification Search ........................ None
See application file for complete search history.

(56) References Cited

U.S. PATENT DOCUMENTS

| | | | | |
|---|---|---|---|---|
| 6,490,280 | B1 * | 12/2002 | Leung | 370/392 |
| 7,031,325 | B1 * | 4/2006 | Williams | 370/401 |
| 2005/0013306 | A1 * | 1/2005 | Albrecht | 370/395.53 |
| 2006/0245438 | A1 * | 11/2006 | Sajassi et al. | 370/399 |
| 2007/0121655 | A1 * | 5/2007 | Jin | 370/401 |
| 2008/0259924 | A1 * | 10/2008 | Gooch et al. | 370/392 |

OTHER PUBLICATIONS

Wikipedia, IEEE 802.1Q, Oct. 11, 2007 (See end of document), Wikipedia, All pages pertinent.*

* cited by examiner

*Primary Examiner* — Gregory B Sefcheck
*Assistant Examiner* — Otis L Thompson, Jr.
(74) *Attorney, Agent, or Firm* — ChapinIP Law, LLC

(57) ABSTRACT

A second VLAN tag is prepended to a packet prepended with a first VLAN tag when the packet is forwarded from a first port to a second port to result in an Q-in-Q packet. The second port has output connected to input of a third port. A third VLAN tag is prepended to the Q-in-Q packet when the Q-in-Q packet is forwarded from the third port to a fourth port to result in an Q-in-Q-in-Q packet.
In another embodiment, a third VLAN tag is stripped from a Q-in-Q-in-Q packet prepended with first, second, and third VLAN tags to result in a Q-in-Q packet when the Q-in-Q-in-Q packet is forwarded from a first port to a second port. The second port has output connected to input of a third port. The second VLAN tag is stripped from the Q-in-Q packet.

33 Claims, 10 Drawing Sheets

USING Q-IN-Q-IN-Q TO IMPLEMENT ETHERNET SERVICE UNIT RING

BACKGROUND

1. Field of the Invention

Embodiments of the invention relate to the field of network communication, and more specifically, to virtual local area network (VLAN) stacking.

2. Description of Related Art

Ethernet is the most widely deployed Local Area Network (LAN) technology in the world today. Virtual Local Area Network (VLAN) is an Ethernet service defined in the Institute of Electrical and Electronics Engineers (IEEE) 802.1Q standard. The IEEE 802.1Q standard adds four additional bytes to the standard IEEE 802.3 Ethernet frame and is referred to as the VLAN tag. Q-in-Q is an IEEE 802.1ad standard, also known as VLAN stacking, provides a second VLAN tag, sometimes called the Provider tag, which is prepended to each customer packet. A VLAN tag field is 4 bytes long, but only 12 bits may be used for VLAN information. When used to support an Ethernet Service Unit (ESU) ring, 12 bits in an outer VLAN tag may be insufficient to contain all the packet forwarding information required in the ESU ring.

Existing techniques to solve the problem have a number of drawbacks. One technique uses the Medium Access Control (MAC)-in-MAC encapsulation as defined by the IEEE 802.1ah standard. However, this technique typically requires high-end Ethernet switch processors which may be too expensive for ESU edge boxes. Another technique may use proprietary solutions. However, this technique requires all equipment in an ESU ring to be constructed using components from proprietary sources.

BRIEF DESCRIPTION OF THE DRAWINGS

Embodiments of the invention may best be understood by referring to the following description and accompanying drawings that are used to illustrate embodiments of the invention. In the drawings.

DESCRIPTION

An embodiment of the present invention includes a technique to process a packet in a virtual local area network (VLAN). A second VLAN tag is prepended to a packet prepended with a first VLAN tag when the packet is forwarded from a first port (e.g., a first user-network interface (UNI)) port to a second (e.g., a first network-network interface (NNI)) port to result in an Q-in-Q packet. The second (e.g., the first NNI) port has output connected to input of a third (e.g., a second UNI) port. A third VLAN tag is prepended to the Q-in-Q packet when the Q-in-Q packet is forwarded from the third (e.g., the second UNI) port to a fourth (e.g., a second NNI) port to result in an Q-in-Q-in-Q packet.

In another embodiment, a third VLAN tag is stripped from a Q-in-Q-in-Q packet prepended with first, second, and third VLAN tags to result in a Q-in-Q packet when the Q-in-Q-in-Q packet is forwarded from a first (e.g., a first NNI) port to a second (e.g., a first UNI) port. The second (e.g., the first, UNI) port has output connected to input of a third (e.g., a second NNI) port. The second VLAN tag is stripped from the Q-in-Q packet when the Q-in-Q packet is forwarded from the third (e.g., the second NNI) port to a fourth (e.g., a second UNI) port.

In the following description, numerous specific details are set forth. However, it is understood that embodiments of the invention may be practiced without these specific details. In other instances, well-known circuits, structures, and techniques have not been shown in order not to obscure the understanding of this description.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Embodiments of the invention include a technique to tag VLAN packets to provide additional VLAN information in the packets routed between an Ethernet routing switch (ERS) or a head end equipment and an Ethernet service unit (ESU) or an end user equipment. Two or more available Ethernet ports in the ESU are used to daisy chain the UNI and NNI ports together. When a packet is ingressed from the ESU to the ERS, a third VLAN tag is prepended to a Q-in-Q packet to result in a Q-in-Q-in-Q packet. When the Q-in-Q-in-Q packet is egressed from the ERS to the ESU, the third VLAN tag is stripped from the Q-in-Q-in-Q packet. The tagging and stripping may be performed using existing Q-in-Q equipment.

Figure 1:
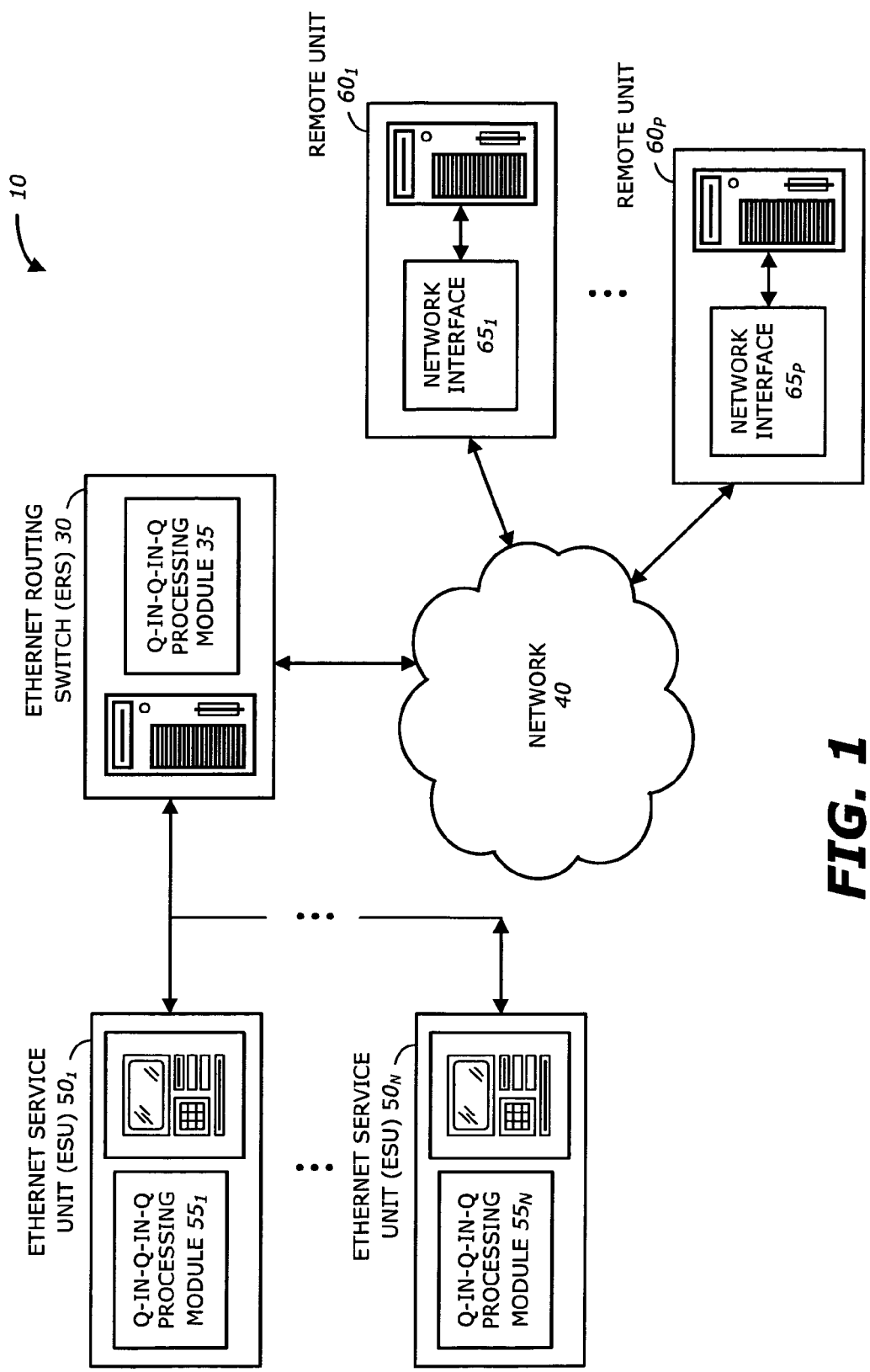
FIG. 1 is a diagram illustrating a system according to one embodiment of the invention.

FIG. 1 is a diagram illustrating a system 10 according to one embodiment of the invention. The system 10 includes an Ethernet routing switch (ERS) 30, a network 40, N Ethernet service units (ESUs) $50_1$ to $50_N$, and P remote units $60_1$ to $60_P$. The system 10 may include more or less than the above components.

The ERS 30 routes Ethernet packets to and from the ESUs $50_1$ to $50_N$ and the remote units $60_1$ to $60_P$ via the network 40. The ERS 30 may have multiple switches to form a virtual network fabric. The ERS 30 includes a Q-in-Q-in-Q processing module 35 to process Q-in-Q-in-Q packets. The network 40 is any suitable network. It may be the Internet, a Local Area Network (LAN), a Wide Area Network (WAN), intranet, extranet, etc. The network 40 may have secure router that supports network protocols such as Internet Protocol (IP)v4-IPv6, or frame relay Multi-protocol Label Switching (MPLS). The N ESUs $50_1$ to $50_N$ are delivery points for Ethernet and IP-based services at the edge of the service provider network. They typically support network access, video transport, Ethernet virtual private network (VPN) service and other applications. Any one of the N ESUs $50_1$ to $50_N$ may enable an Ethernet-over-dark-fiber access ring topology to maximize bandwidth utilization and network reliability. An ESU $50_k$ (k=1, . . . , N) includes a Q-in-Q-in-Q processing module 35k to process Q-in-Q-in-Q packets.

The P remote units $60_1$ to $60_P$ include any subsystems, units, or servers that are located remotely and interfaced to the network 40 to receive and transmit packets from and to the ERS 30. A remote unit $60_k$ (k=1 . . . . , P) may include a network interface $65_k$ to interface to the network 40. The network interface $65_k$ may include a Digital Subscriber Line (DSL) or cable modem which may interface to an IPsec VPN or any other network elements.

The packets forwarded or transmitted between the ERS 30 and any one of the ESUs $50_1$ to $50_N$ may have a number of formats.

Figure 2:
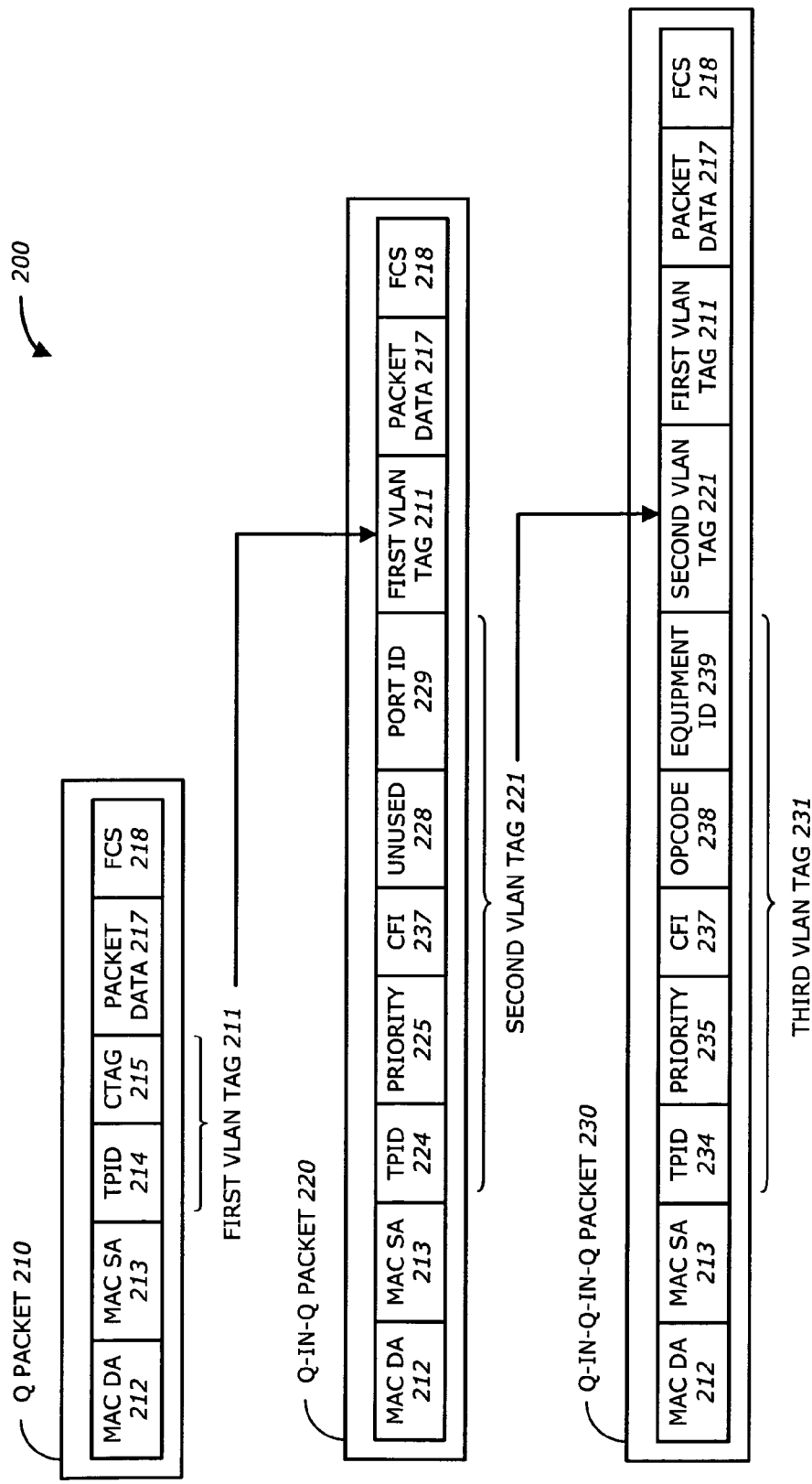
FIG. 2 is a diagram illustrating formats of packets according to one embodiment of the invention.

FIG. 2 is a diagram illustrating formats of packets according to one embodiment of the invention. The formats 200 include formats for a Q packet 210, a Q-in-Q packet 220, and a Q-in-Q-in-Q packet 230.

The Q packet 210 includes fields for a Medium Access Control (MAC) destination address (DA) 212, a MAC source address (SA) 213, a Tag Protocol Identifier (TPID) 214, a Customer VLAN tag (CTAG) 215, Packet data 217, and a Frame Check Sequence (FCS) 218. The Q packet 210 typically follows the format as defined by the IEEE 802.1Q standard. The TPID 214 and the CTAG 215 form a first VLAN tag 211.

The Q-in-Q packet 220 includes fields for the MAC DA 212, MAC SA 213, a TPID 224, a priority 225, a canonical format indicator (CFI) 227, an unused field 228, a port identifier 229, the first VLAN tag 211, the packet data 217 and the FCS 218. The Q-in-Q packet 220 typically follows the format as defined by the IEEE 802.1ad Q-in-Q standard with some modifications. For example, the unused field may be 6-bit and the port identifier 229 may be 6-bit. The port ID 229 may be used to specify the port number in a unit such as the ESU. The TPID 224, the priority 225, the CFI 227, the unused field 228, and the port identifier 229 form a second VLAN tag 221. The Q-in-Q packet 220 may be formed by inserting or prepending the VLAN tag 221 in the Q packet 210.

The Q-in-Q-in-Q packet 230 includes fields for the MAC DA 212, MAC SA 213, a TPID 234, a priority 235, a CFI 237, an opcode 238, an equipment identifier 239, the second VLAN tag 221, the first VLAN tag 211, the packet data 217 and the FCS 218. The opcode 238 may be a 4-bit field to specify the operation operated on the packet. Examples of the operation may include: ingress packet from end user to head end, egress packet unicast from head end to single end user port, egress packet broadcast from head end to multiple end user ports, etc. The equipment ID 239 may be used to specify the equipment number such as the ESU in a system having multiple ESUs. The TPID 234, the priority 235, the CFI 237, the opcode 238, and equipment identifier 239 form a third VLAN tag 231. The Q-in-Q-in-Q packet 230 may be formed by inserting or prepending the third VLAN tag 231 in the Q-in-Q packet 220. The Q-in-Q-in-Q packet 230 may be formed using processing modules that are used to form the Q-in-Q packet 220 with some minor modifications. Accordingly, existing equipment used for Q-in-Q processing may be employed. In the Q-in-Q-in-Q packet 230, the first VLAN tag 211 is located at the innermost portion of the packet and the third VLAN tag 231 is located at the outermost portion. The second VLAN tag 221 is located in the middle portion.

The Q-in-Q-in-Q packet 230 contains additional information that may be useful. For example, the equipment ID 239 in the third VLAN tag 231 and the port ID 229 in the second VLAN tag 221 may be combined to determine the specific location of the origination or destination of the packet.

Figure 3:
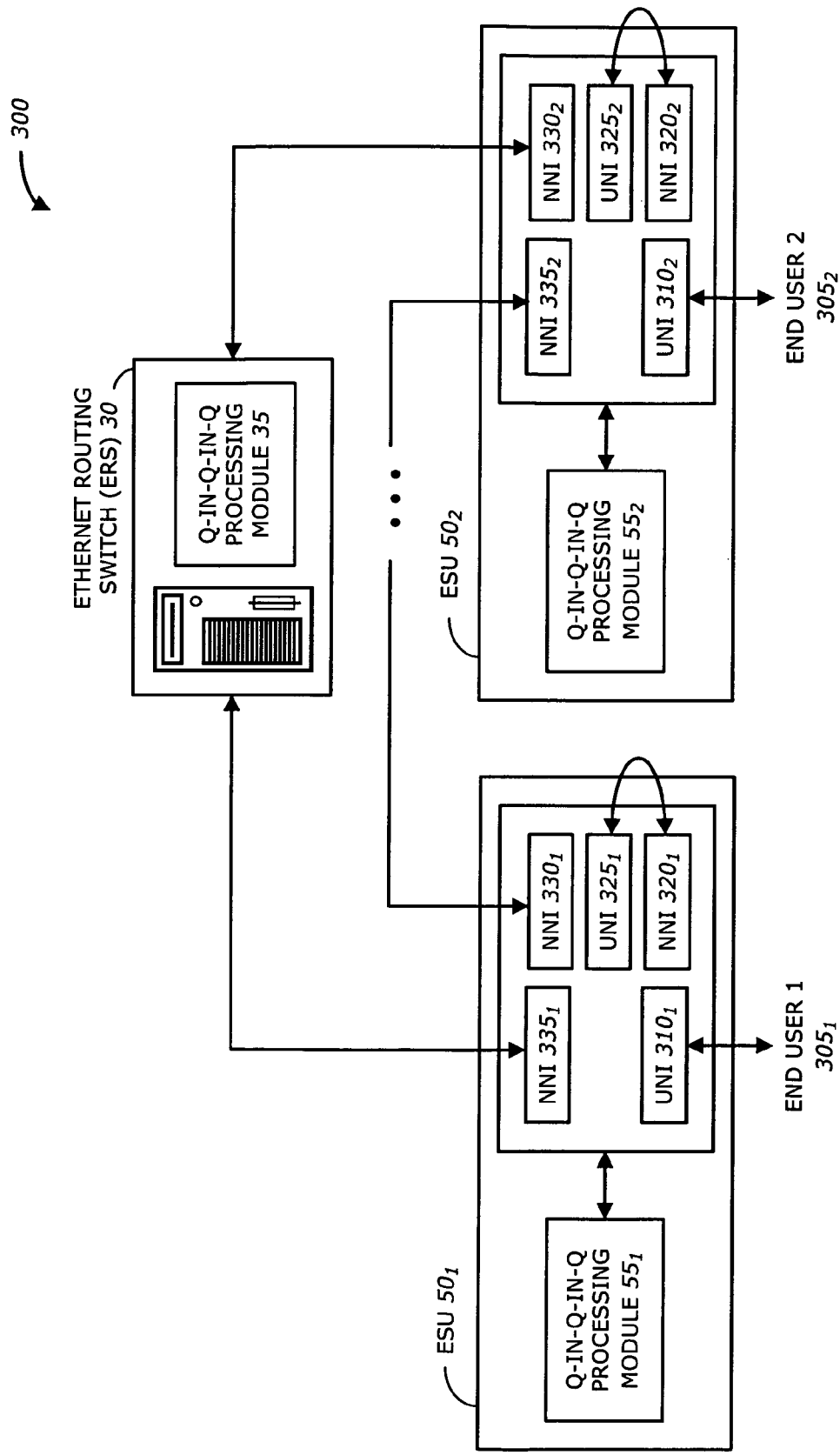
FIG. 3 is a diagram illustrating connections between an Ethernet routing switch (ERS) and two Ethernet service units according to one embodiment of the invention.

FIG. 3 is a diagram illustrating connections 300 between an Ethernet routing switch and two Ethernet service units according to one embodiment of the invention. The connections 300 include connections between the ERS 30, the ESU $50_1$, and the ESU $50_2$.

The ESU $50_1$ includes a UNI port $310_1$, an NNI port $320_1$, a UNI port $325_1$, an NNI port $330_1$, and an NNI port $335_1$. An end user 1 $305_1$ is interfaced to the UNI port $310_1$ to receive or transmit a packet. The output of the NNI port $320_1$ is connected to the input of the UNI port $325_1$. The output of the UNI port $325_1$ is connected to the input of the NNI port $320_1$. The Q-in-Q-in-Q processing module 551 processes a packet as it is forwarded through the ports. Similarly, the ESU $50_2$ includes a UNI port $310_2$, an NNI port $320_2$, a UNI port $325_2$, an NNI port $330_2$, and an NNI port $335_2$. An end user 2 $305_2$ is interfaced to the UNI port $310_2$ to receive or transmit a packet. The output of the NNI port $320_2$ is connected to the input of the UNI port $325_2$. The output of the UNI port $325_2$ is connected to the input of the NNI port $320_2$. The Q-in-Q-in-Q processing module $55_2$ processes a packet as it is forwarded through the ports.

The ERS 30 is connected to the ESU $50_1$ at the NNI port $335_1$ and the ESU $50_2$ at the NNI port $330_2$. The NNI $330_1$ of the ESU $50_1$ is connected to the NNI $335_2$ of the ESU $50_2$. Through these connections, various packets may be forwarded from the end users 1 and 2 to the ERS 30 or from the ERS 30 to any one of the end users 1 and 2.

Figure 4A:
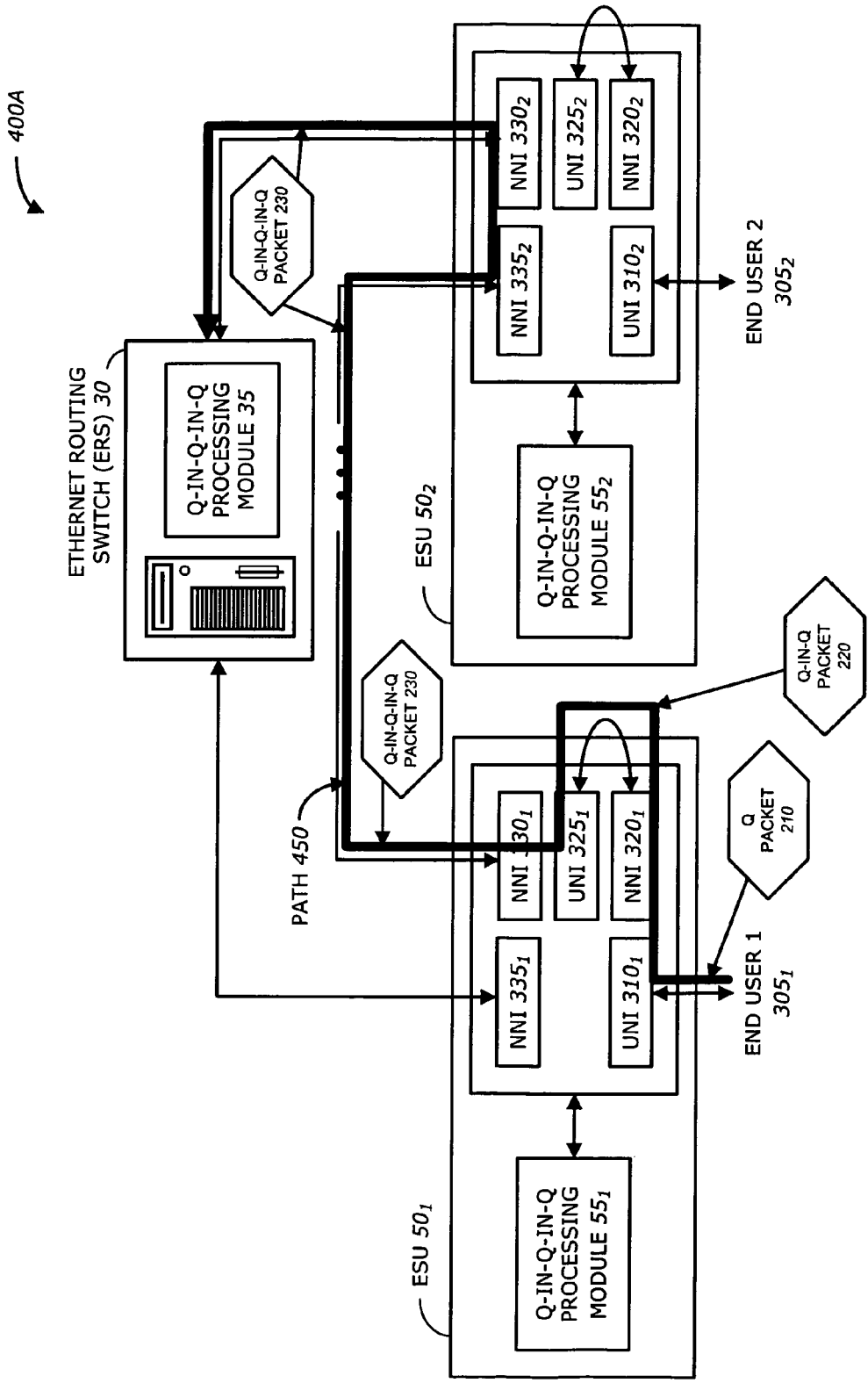
FIG. 4A is a diagram illustrating a forwarding path of an ingress packet from the ESU to the ERS according to one embodiment of the invention.

FIG. 4A is a diagram illustrating a forwarding path 450 of an ingress packet from the ESU to the ERS according to one embodiment of the invention. An ingress packet is forwarded from the end user 1 $305_1$ to the ERS 30 through the path 450. The path 450 traverses from the end user 1 $305_1$ to the ESU $50_1$ and then to the ESU $50_2$ and finally to the head end or the ERS 30. As the path 450 goes through the ESU $50_1$, it traverses through the UNI port $310_1$, the NNI port $320_1$, the UNI port $335_1$, and the NNI port $330_1$. As the path goes through the ESU $50_2$, it traverses through the NNI $335_2$ and the NNI port $330_2$.

The ingress packet starts as the Q packet 210 at the end user 1 $305_1$. The Q packet is prepended with the first VLAN tag 211 as shown in FIG. 2. When the Q packet 210 is forwarded from the UNI port $310_1$ to the NM port $320_1$, the second VLAN tag 221 is prepended to the Q packet 210 to form the Q-in-Q packet 220 with the format as shown in FIG. 2. The second VLAN tag 221 contains a port ID of the port of the end user $305_1$. The Q-in-Q packet 220 is then forwarded from the NNI port $320_1$ to the UNI port $335_1$. When the Q-in-Q packet 220 is forwarded from the UNI port $325_1$ to the NNI port $330_1$, the third VLAN tag 231 is prepended to the Q-in-Q packet 220 to result in the Q-in-Q-in-Q packet 230. The third VLAN tag 231 contains the opcode INGRESS_FROM_END_USER_TO_HEAD-END to indicate the operation that the packet is ingressed from the end user to the head-end or the ERS. The equipment ID contains the ID of the ESU $50_1$. The Q-in-Q-in-Q packet 230 is then forwarded to the ESU $50_2$ and reaches the ERS 30. The Q-in-Q-in-Q processing module 35 in the ERS 30 may examine the second VLAN tag 221 and the third VLAN tag 231 to determine the operation, the identifiers of the specific port and the ESU.

Figure 4B:
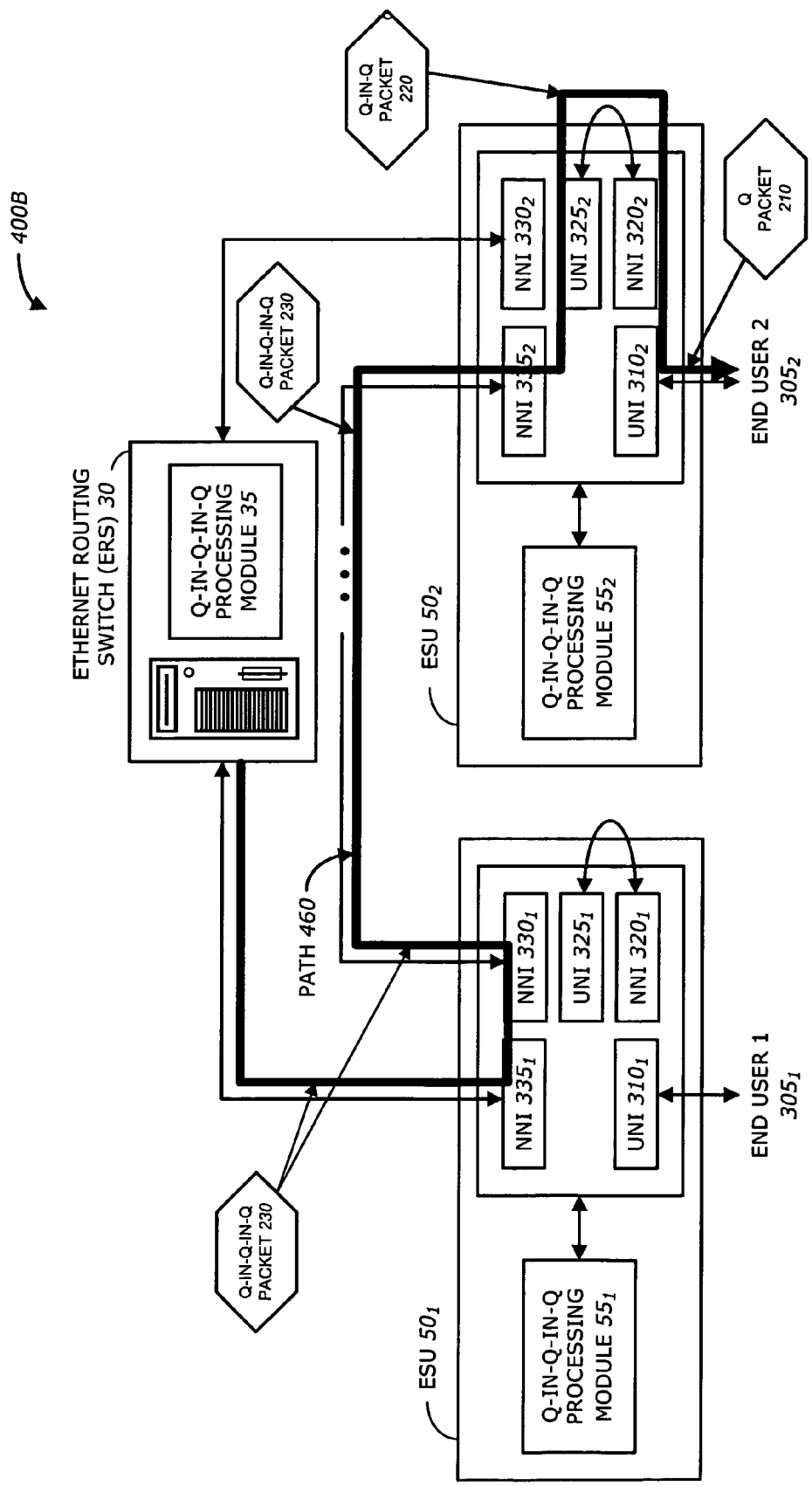
FIG. 4B is a diagram illustrating a forwarding path of an egress unicast packet from the ERS to the ESU according to one embodiment of the invention.

FIG. 4B is a diagram illustrating a forwarding path 460 of an egress unicast packet from the ERS to the ESU according to one embodiment of the invention. An egress packet is unicast from the ERS 30 to the end user $305_2$ through the path 460. The path 460 traverses from the ERS 30 through the ESU $50_1$ and then through the ESU $50_2$ and finally to the end user $305_2$. As the path 460 goes through the ESU $50_1$ it traverses through the NNI port $335_1$ and the NNI port $330_1$. As the path goes through the ESU $50_2$, it traverses through the NNI port $335_2$, the UNI port $325_2$, the NNI port $320_2$, the UNI port $310_2$, and then the end user $305_2$.

The egress packet starts as the Q-in-Q-in-Q packet 230 exiting the ERS 30. The Q-in-Q-in-Q packet 230 is prepended with the first VLAN tag 211, the second VLAN tag 221, and the third VLAN tag 231 as shown in FIG. 2. The second VLAN tag 221 contains the port ID of the port of the end user $305_2$. The third VLAN tag 231 contains the opcode EGRESS_HEAD-END_UNICAST_TO_END_USER. The equipment ID contains the ID of the ESU $50_2$. The Q-in-Q-in-Q packet 230 maintains its three tags through the NNI port $335_1$, the NNI port $330_1$, and the NNI port $335_2$. When the Q-in-Q-in-Q packet 230 is forwarded from the NNI port $335_2$ to the UNI port $325_2$, the third VLAN tag 231 is stripped from the Q-in-Q-in-Q packet 230 to result in the Q-in-Q packet 220. When the Q-in-Q packet 220 is forwarded from the NM port $320_2$ to the UNI port $310_2$, the second VLAN tag 221 is stripped from the Q-in-Q packet 220 to result in the Q packet 210. The Q-in-Q-in-Q processing module $55_2$ in the ESU $50_2$ may examine the second VLAN tag 221 and the third VLAN tag 231 to determine the operation and the identifiers of the specific port and the ESU. Based on the information contained in the tags, the Q-in-Q-in-Q processing module $55_2$ in the ESU $50_2$ may decide whether to continue to forward the pack on the ring, to strip the tags, or other tasks.

Figure 4C:
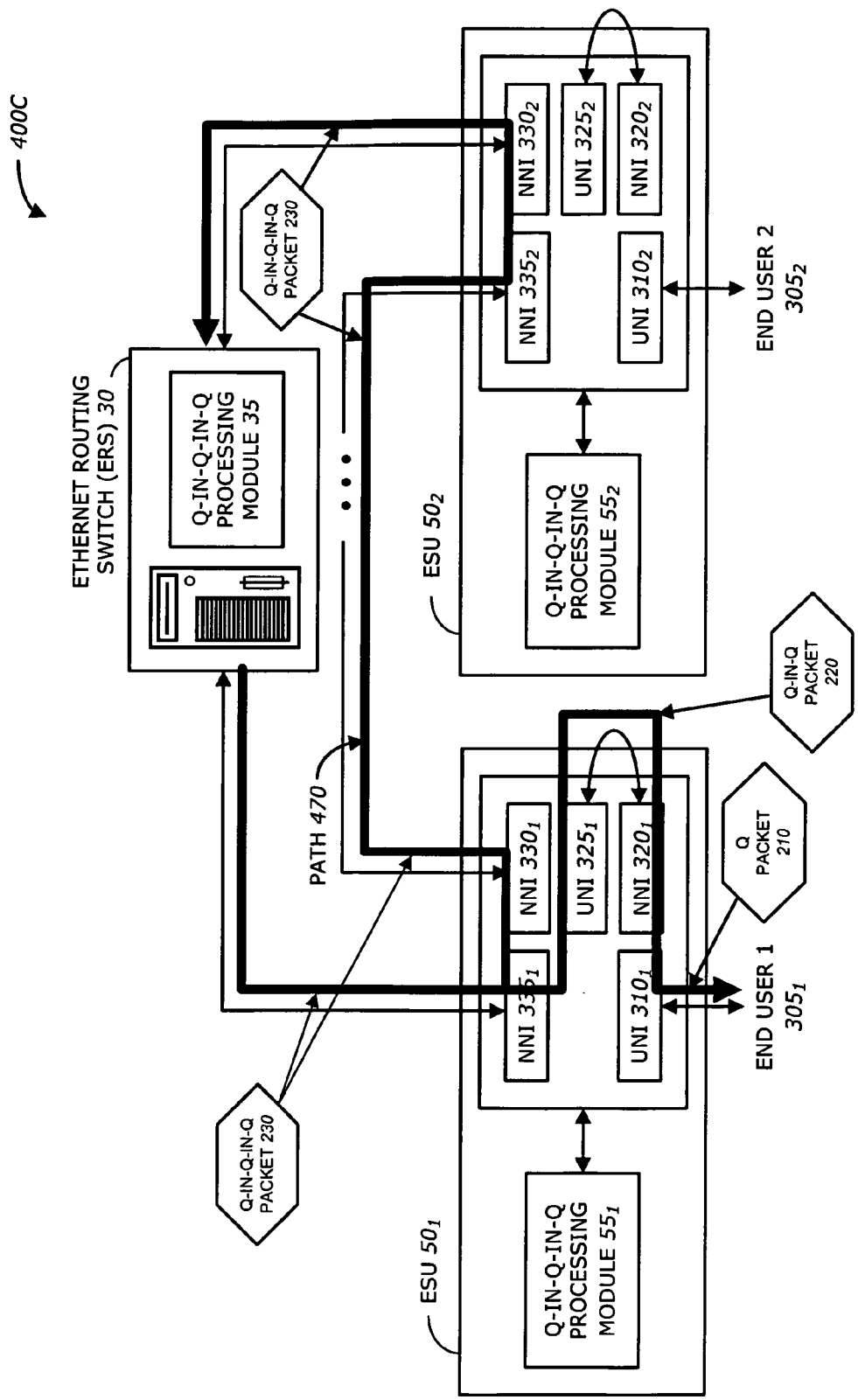
FIG. 4C is a diagram illustrating a forwarding path of an egress broadcast packet from the ERS to multiple ESUs according to one embodiment of the invention.

FIG. 4C is a diagram illustrating a forwarding path 470 of an egress broadcast packet from the ERS to multiple ESUs according to one embodiment of the invention. An egress packet is broadcast from the ERS 30 to the end user $305_1$ and other ESUs through the path 470, except for ESU $50_2$. The path 470 traverses from the ERS 30 through the ESU $50_1$ to the end user $305_2$. The path 470 continues from the ESU $50_1$ through the ESU $50_2$. As the path 470 goes through the ESU $50_1$, it traverses through the NNI port $335_1$, the UNI port $325_1$, the NNI port $320_1$, the UNI port $310_1$, and then the end user $305_1$. It also goes to the NNI port $330_1$ to go to the ESU $50_2$. As the path goes through the ESU $50_2$, it traverses through the NNI port $335_2$ and the NNI port $330_2$.

The egress packet starts as the Q-in-Q-in-Q packet 230 exiting the ERS 30. The Q-in-Q-in-Q packet 230 is prepended with the first VLAN tag 211, the second VLAN tag 221, and the third VLAN tag 231 as shown in FIG. 2. The third VLAN tag 231 contains the opcode EGRESS_HEAD-END_BROADCAST_TO_END_USERS. The equipment ID is the ID of the ESU $50_2$. In this case, the equipment ID indicates which ESU should not transmit the packet. Thus, ESU $50_2$ handles the packet differently from all other ESUs. The Q-in-Q-in-Q packet 230 maintains its three tags through the NNI port $335_1$, the NNI port $330_1$, the NNI port $335_2$, and the NNI port $330_2$. When the Q-in-Q-in-Q packet 230 is forwarded from the NNI port $335_1$ to the UNI port $325_1$, the third VLAN tag 231 is stripped from the Q-in-Q-in-Q packet 230 to result in the Q-in-Q packet 220. When the Q-in-Q packet 220 is forwarded from the NNI port $320_1$ to the UNI port $310_1$, the second VLAN tag 221 is stripped from the Q-in-Q packet 220 to result in the Q packet 210.

Figure 5:
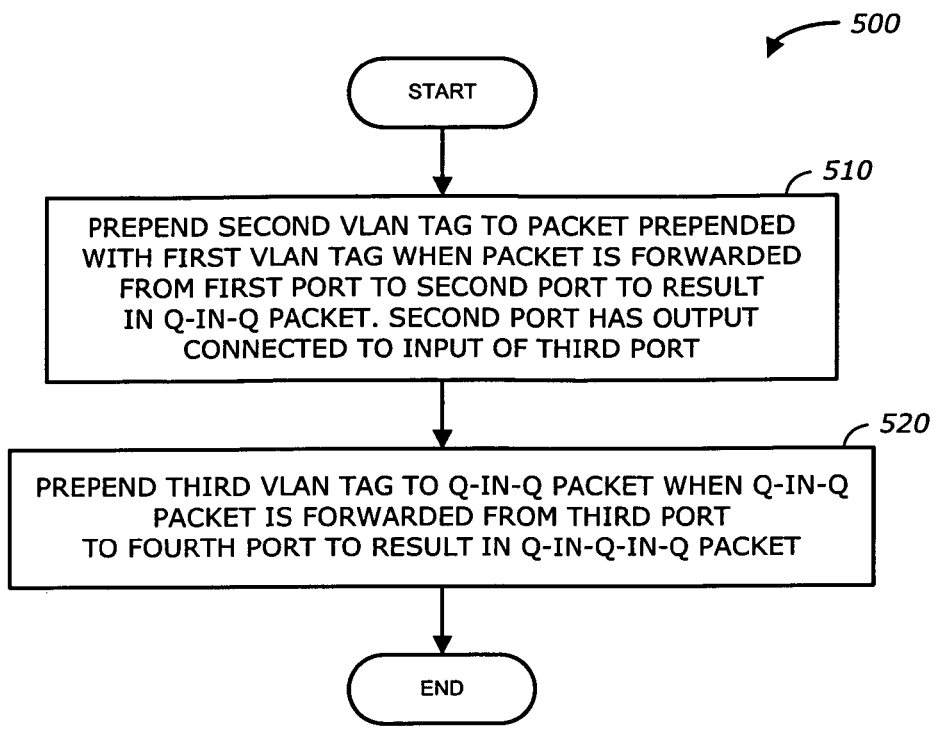
FIG. 5 is a flowchart illustrating a process to prepend a packet according to one embodiment of the invention.

FIG. 5 is a flowchart illustrating a process 500 to prepend a packet according to one embodiment of the invention.

Upon START, the process 500 prepends a second virtual local area network (VLAN) tag to a packet prepended with a first VLAN tag when the packet is forwarded from a first (e.g., a first UNI) port to a second (e.g., a first NNI) port to result in a Q-in-Q packet (Block 510). Prepending means inserting the second VLAN tag to the appropriate location right after the MAC SA as shown in FIG. 2. The second (e.g., the first NNI) port has output connected to input of a third (e.g., a second UNI) port.

Next, the process 500 prepends a third VLAN tag to the Q-in-Q packet when the Q-in-Q packet is forwarded from the third (e.g., the second UNI) port to a fourth (e.g., a second NNI) port to result in a Q-in-Q-in-Q packet (Block 520). The process 500 is then terminated.

Figure 6:
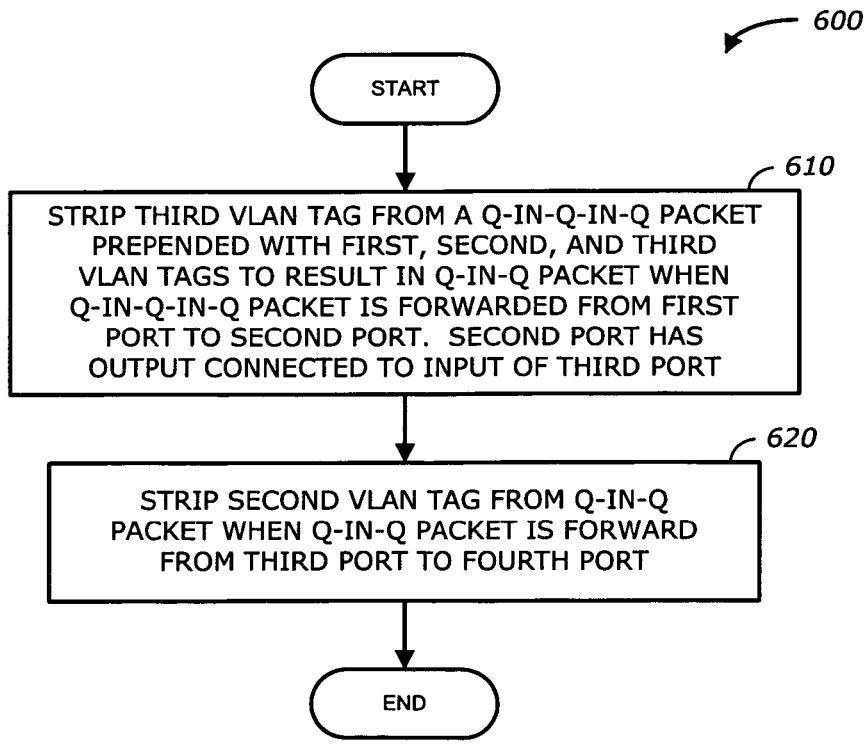
FIG. 6 is a flowchart illustrating a process to strip a Q-in-Q-in-Q packet according to one embodiment of the invention.

FIG. 6 is a flowchart illustrating a process 600 to strip a Q-in-Q-in-Q packet according to one embodiment of the invention.

Upon START, the process 600 strips a third VLAN tag from a Q-in-Q-in-Q packet prepended with first, second, and third VLAN tags to result in a Q-in-Q packet when the Q-in-Q-in-Q packet is forwarded from a first (e.g., a first NNI) port to a second (e.g., a first UNI) port (Block 610). The second (e.g., the first UNI) port has output connected to input of a third (e.g., a second NNI) port. Stripping here means removing the associated tag and collapsing the adjacent fields into the hole created by the removal of the associated tag.

Next, the process 600 strips the second VLAN tag from the Q-in-Q packet when the Q-in-Q packet is forwarded from the third (e.g., the second NNI) port to a fourth (e.g., a second UNI) port (Block 620). The process 600 is then terminated.

Figure 7A:
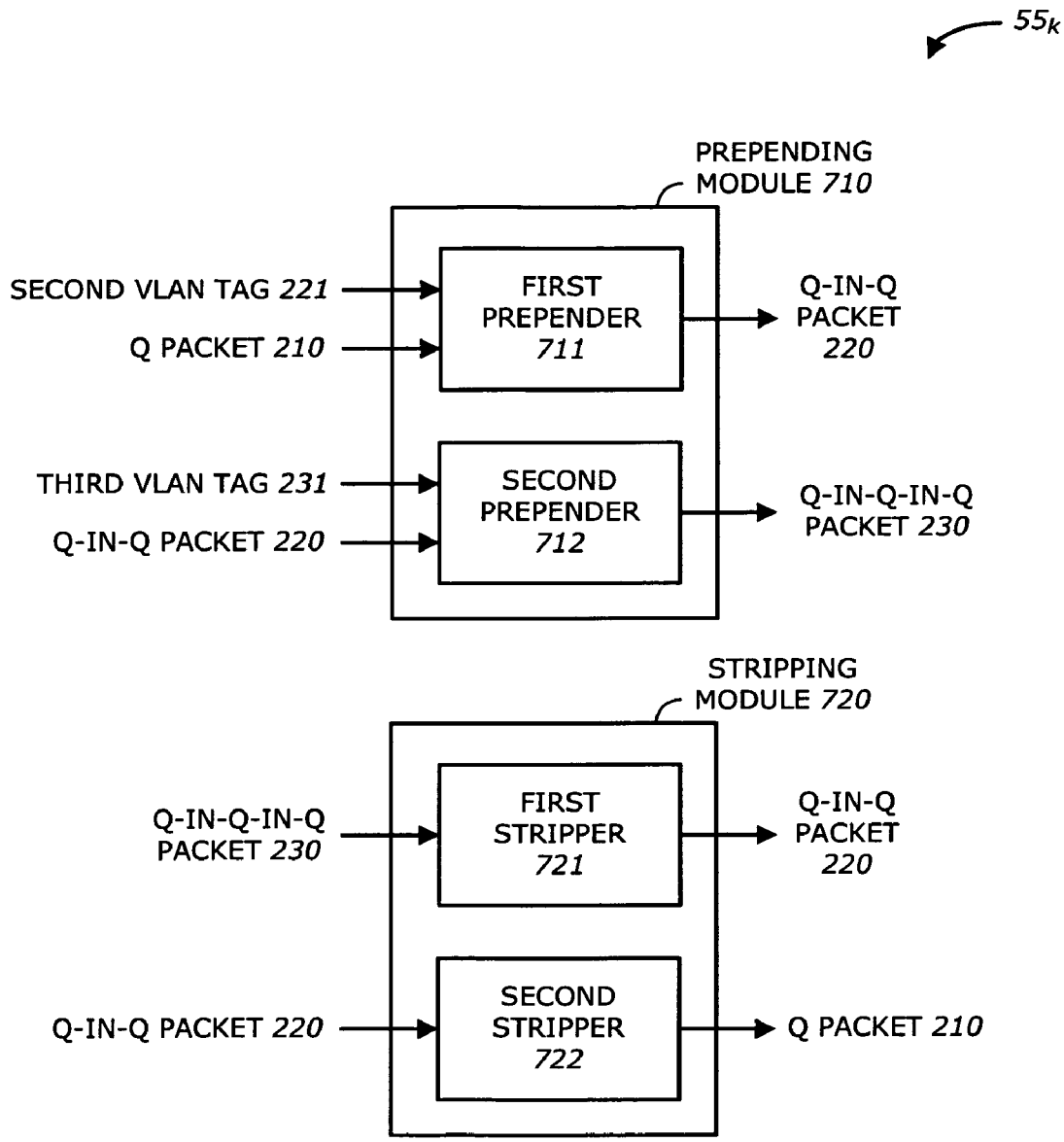
FIG. 7A is a diagram illustrating a Q-in-Q-in-Q processing module using pairs of prependers and strippers according to one embodiment of the invention.

FIG. 7A is a diagram illustrating the Q-in-Q-in-Q processing module $55_k$ shown in FIG. 1 using pairs of prependers and strippers according to one embodiment of the invention. The Q-in-Q-in-Q processing module $55_k$ includes a prepending module 710 and a stripping module 720. These modules may represent hardware circuits, logic units, software modules or functions, or a combination of hardware and software.

The prepending module 710 prepends the second and third VLAN tags to a packet prepended with the first VLAN tag to result in the Q-in-Q-in-Q packet to forward to the ERS. It includes a first prepender 711 and a second prepender 712. The first prepender 711 prepends the second VLAN tag 221 to the packet when the packet is forwarded from a first (e.g., a first UNI) port to a second (e.g., a first NNI) port to result in the Q-in-Q packet 220. The second (e.g., the first NNI) port has output connected to input of a third (e.g., second UNI) port. The second prepender 712 prepends the third VLAN tag 231 to the Q-in-Q packet 220 when the Q-in-Q packet 220 is forwarded from the third (e.g., the second UNI) port to a fourth (e.g., a second NNI) port to result in the Q-in-Q-in-Q packet 230.

The stripping module 720 strips the second and third VLAN tags from the Q-in-Q-in-Q packet received from the ERS. The stripping module 720 includes a first stripper 721 and a second stripper 722. The first stripper 721 strips the third VLAN tag 231 from the Q-in-Q-in-Q packet 230 to result in the Q-in-Q packet 220 when the Q-in-Q-in-Q packet is forwarded from a first (e.g., a first NNI) port to a second (e.g., a first UNI) port. The second (e.g., the first UNI) port has output connected to input of a third (e.g., a second NNI) port. The second stripper 722 strips the second VLAN tag 221 from the Q-in-Q packet 220 to result in the packet 210 when the Q-in-Q packet is forwarded from the third (e.g., the second NNI) port to a fourth (e.g., a second UNI) port.

Figure 7B:
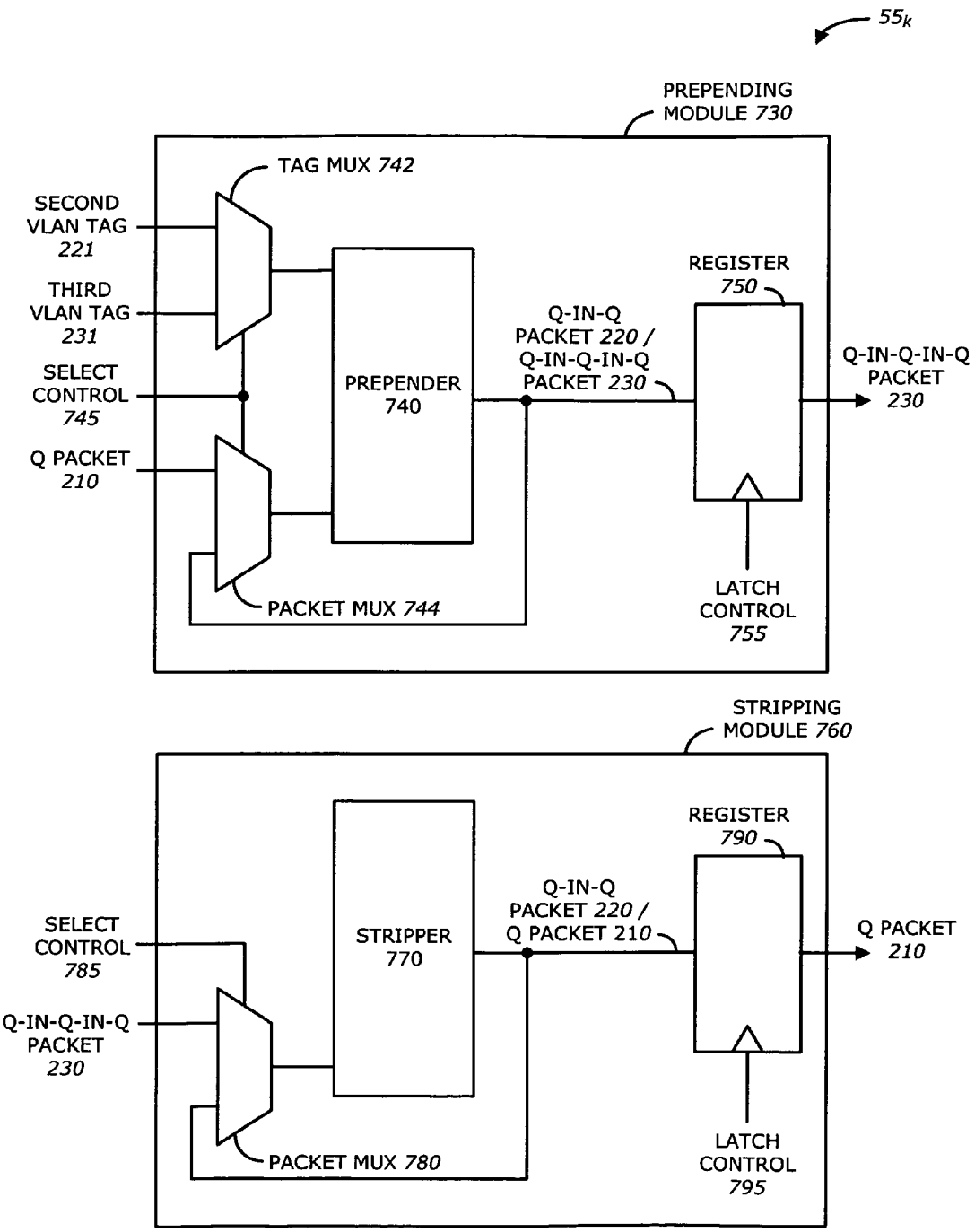
FIG. 7B is a diagram illustrating a Q-in-Q-in-Q processing module using one prepender and one stripper according to one embodiment of the invention.

FIG. 7B is a diagram illustrating the Q-in-Q-in-Q processing module $55_k$ shown in FIG. 1 using one prepender and one stripper according to one embodiment of the invention. The Q-in-Q-in-Q processing module $55_k$ includes a prepending module 730 and a stripping module 760. These modules may represent hardware circuits, logic units, software modules or functions, or a combination of hardware and software.

The prepending module 730 includes a prepender 740, a tag multiplexer (MUX) 742, a packet multiplexer (MUX) 744, and a register 750. In essence, the operation of the prepending module 730 is similar to the prepending module 710 shown in FIG. 7A except that it uses a single prepender twice. The prepender 730 prepends a tag selected from the tag MUX 742 to a packet selected from the packet MUX 744. The tag MUX selects one of the second VLAN tag 221 and the third VLAN tag 231. The packet MUX selects one of the Q packet 210 and the output of the prepender. Both multiplexers are controlled by a select control signal 745. The register 750 is used to latch or store the output of the prepender 740. It is controlled by the latch control signal 755.

The prepending module 730 prepends a packet twice in two time periods. In the first time period, the select control signal 745 is at a first logic level (e.g., LOW) to select the second VLAN tag 221 at the tag MUX 742 and the Q packet 210 at the packet MUX 744. The prepender 740 then prepends the second VLAN tag 21 to the Q packet 210 when the packet is forwarded from a first (e.g., a first UNI) port to a second (e.g., a first NNI) port to result in the Q-in-Q packet 220 at its output. The latch control signal 755 is at a first logic level to disable the loading of the Q-in-Q PACKET 220. The second (e.g., the first NNI) port has output connected to input of a third (e.g., second UNI) port. In the second time period, the select control signal 745 is at a second logic level (e.g., HIGH) to select the third VLAN tag 231 at the tag MUX 742 and the Q-in-Q packet 220 which is taken from the output of the prepender 740. The prepender 740 then prepends the third VLAN tag 231 to the Q-in-Q packet 220 when the Q-in-Q packet 220 is forwarded from the third (e.g., the second UNI) port to a fourth (e.g., a second NNI) port to result in the Q-in-Q-in-Q packet 230. The latch control signal 755 is at a second logic level to enable the loading of the Q-in-Q-in-Q packet 230 at its output.

As discussed above, the prepending module 730 may be implemented by hardware or software. The circuit shown in FIG. 7B illustrates a hardware implementation. For a software implementation, the prepender 740 may be a function or a routine that inserts the selected VLAN tag to the packet string. The tag MUX 742 and the packet MUX 744 may be implemented as a case—switch or if . . . then . . . else statement. The register 750 may be implemented as a variable and the loading to the register 750 may be implemented as an assignment statement.

Similarly, the stripping module 760 includes a stripper 770, a packet MUX 780 and a register 790. The stripper 770 strips the packet selected from the packet MUX 780. Its output is fed back to the input of the packet MUX 780. The packet MUX 780 thus selects one of the Q-in-Q-in-Q packet 230 and the Q-in-Q packet 220 from the output of the prepender 770. The packet MUX 780 is controlled by the select control signal 785. The register 790 loads the output of the stripper 770 under the control of a latch control signal 795.

The stripping module 760 strips a packet twice in two time periods. In the first time period, the select control signal 785 is at a first logic level (e.g., LOW) to allow the packet MUX 780 to select the Q-in-Q-in-Q packet 230. The stripper 770 strips the third VLAN tag 231 from the Q-in-Q-in-Q packet 230 to result in the Q-in-Q packet 220 when the Q-in-Q-in-Q packet is forwarded from a first (e.g., a first NNI) port to a second (e.g., a first UNI) port. The latch control signal 795 is at a first logic level to disable the loading of the register 790. The second (e.g., the first UNI) port has output connected to input of a third (e.g., a second NNI) port. In the second time period, the select control signal 785 is at a second logic level (e.g., HIGH) to allow the packet MUX 780 to select the Q-in-Q packet 220 which is fed back from the output of the stripper 770. The stripper 770 strips the second VLAN tag 221 from the Q-in-Q packet 220 to result in the Q packet 210 when the Q-in-Q packet is forwarded from the third (e.g., the second NNI) port to a fourth (e.g., a second UNI) port. The latch control signal 795 is then at a second logic level to load the Q packet 210 to the register 790.

As discussed above, the stripping module 760 may be implemented by hardware or software in a similar manner as with the prepending module 730.

The Q-in-Q-in-Q processing module $55_k$ as implemented in FIG. 7A has the same functionality as that implemented in FIG. 7B. The designation of first prepender, second prepender, first stripper, and second stripper, therefore, may be equally interpreted in both implementations. For example, the first prepender may be interpreted as the first prepender 711 shown in FIG. 7A or the prepender 740 while operating in the first time period as shown in FIG. 7B. The second prepender may be interpreted as the second prepender 712 as shown in FIG. 7A or the prepender 740 while operating in the second time period as shown in FIG. 7B. Similarly, the first stripper may be interpreted as the first stripper 721 shown in FIG. 7A or the stripper 770 while operating in the first time period as shown in FIG. 7B. The second stripper may be interpreted as the second stripper 722 as shown in FIG. 7A or the stripper 770 while operating in the second time period as shown in FIG. 7B.

It is also noted that although the UNI and NNI ports are used to illustrate the forwarding of a packet through the ESUs, embodiments of the invention are not limited to the use of these ports. Any communication ports may be used. In addition, the term "port" may designate any communication terminal or point where a packet may originate from or may be destined to.

Other embodiments of the invention include prepending the second VLAN tag 221 and the third VLAN tag 231 at the same time using only a single prepender when a packet prepended by the first VLAN tag 211 is forwarded from a first port to a second port. Similarly, a single stripper may be used to strip both the second VLAN tag 221 and the third VLAN tag 231 at the same time from a packet prepended by first, second, and third VLAN tags when the packet is forwarded from a first port to a second port. Furthermore, the VLAN tag 221 and the third VLAN tag 231 may be combined to form a composite VLAN tag. A single prepender may be used to prepend the composite VLAN tag to a packet when the packet is forwarded from a first port to a second port. Similarly, a single stripper may be used to strip the composite VLAN tag from a packet when the packet is forward from a first port to a second port.

Figure 8:
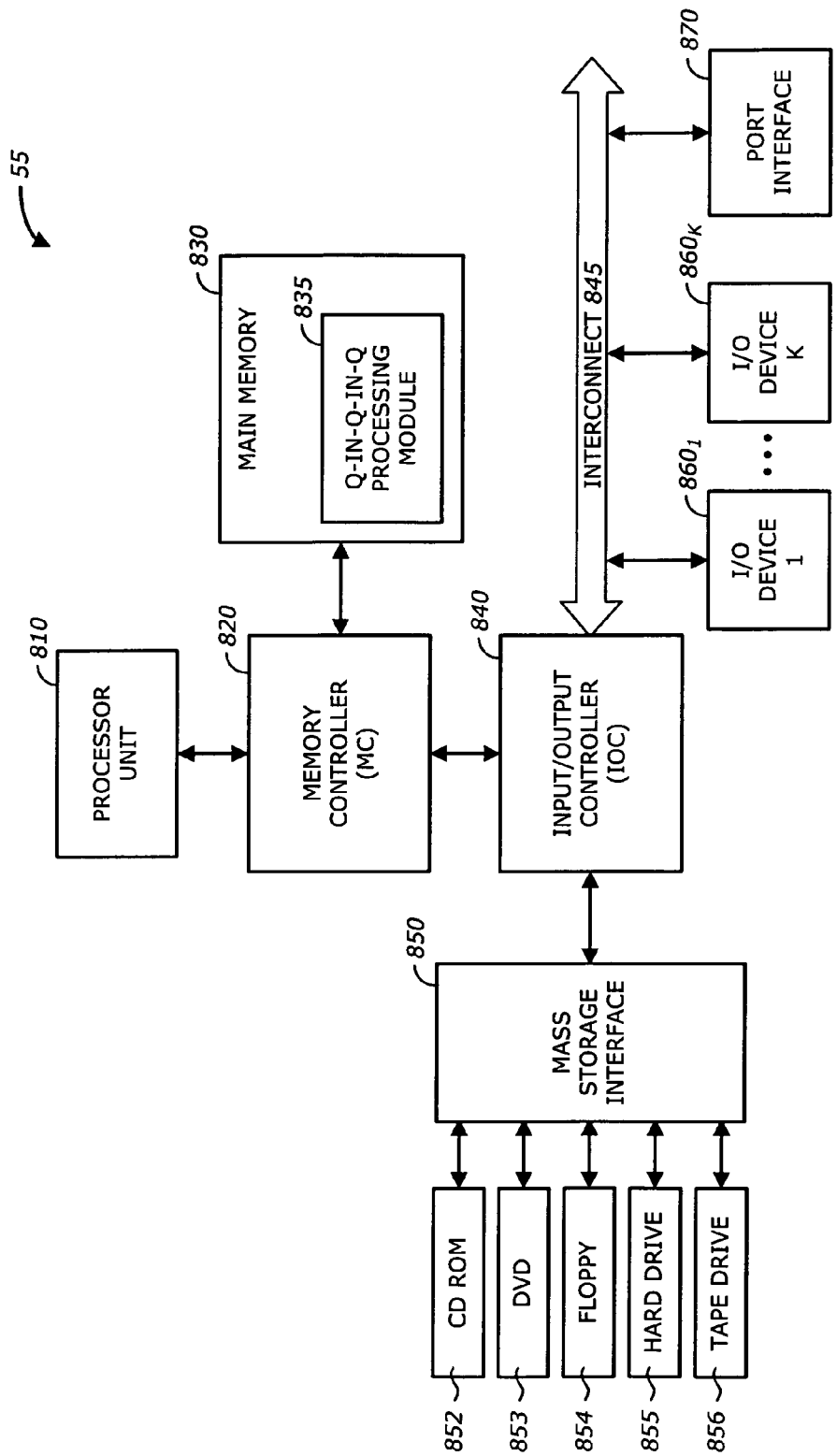
FIG. 8 is a diagram illustrating a processing unit to perform Q-in-Q-in-Q processing according to one embodiment of the invention.

FIG. 8 is a diagram illustrating a processing unit 55 implementing the Q-in-Q-in-Q processing module $55_k$ shown in FIG. 1 to perform Q-in-Q-in-Q processing according to one embodiment of the invention. The processing unit 55 includes a processor unit 810, a memory controller (MC) 820, a main memory 830, an input/output controller (IOC) 840, an interconnect 845, a mass storage interface 850, and input/output (I/O) devices $860_1$ to $860_K$, and a port interface 870. The processing unit 55 may contain more or less than the above components.

The processor unit 810 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The MC 820 provides control and configuration of memory and input/output devices such as the main memory 830 and the IOC 840. The MC 820 may be integrated into a chipset that integrates multiple functionalities such as graphics, media, isolated execution mode, host-to-peripheral bus interface, memory control, power management, etc. The MC 820 or the memory controller functionality in the MCH 820 may be integrated in the processor unit 810. In some embodiments, the memory controller, either internal or external to the processor unit 810, may work for all cores or processors in the processor unit 810. In other embodiments, it may include different portions that may work separately for different cores or processors in the processor unit 810.

The main memory 830 stores system code and data. The main memory 830 is typically implemented with dynamic random access memory (DRAM), static random access memory (SRAM), or any other types of memories including those that do not need to be refreshed. The main memory 830 may include multiple channels of memory devices such as DRAMs. The main memory 830 may include a Q-in-Q-in-Q processing module 835. The Q-in-Q-in-Q processing module 835 includes program instructions and data to perform Q-in-Q-in-Q processing as described above.

The IOC 840 has a number of functionalities that are designed to support I/O functions. The IOC 840 may also be integrated into a chipset together or separate from the MC 820 to perform I/O functions. The IOC 840 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc.

The interconnect 855 provides interface to peripheral devices. The interconnect 855 may be point-to-point or connected to multiple devices. For clarity, not all interconnects are shown. It is contemplated that the interconnect 855 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 850 interfaces to mass storage devices to store archive information such as code, programs, files, data, and applications. The mass storage interface 850 may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include a compact disk (CD) read-only memory (ROM) 852, a digital versatile disc (DVD) 853, a floppy drive 854, a hard drive 855, a tape drive 856, and any other magnetic or optic storage devices. The mass storage device provides a mechanism to read machine-accessible media.

The I/O devices $860_1$ to $860_K$ may include any I/O devices to perform I/O functions. Examples of I/O devices $860_1$ to $860_K$ include controller for input devices (e.g., keyboard, mouse, trackball, pointing device, and remote control unit), media card (e.g., audio, video, and graphic), and any other peripheral controllers. The port interface 870 provides interface to the various NNI and UNI ports.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. A hardware implementation may include circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EPROM). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include information or data that, when accessed by a machine, cause the machine to perform the operations or actions described above. The machine accessible medium may also include program code embedded therein. The program code may include machine readable code to perform the operations or actions described above. The term "information" or "data" here refers to any type of information that is encoded for machine-readable purposes. Therefore, it may include program, code, data, file, etc.

All or part of an embodiment of the invention may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
  prepending a second virtual local area network (VLAN) tag to a packet prepended with a first VLAN tag when the packet is forwarded from a first port to a second port to result in an Qin-Q packet, the second port having output connected to input of a third port; and
  prepending a third VLAN tag to the Q-in-Q packet when the Q-in-Q packet is forwarded from the third port to a fourth port to result in an Q-in-Q-in-Q packet, wherein the third VLAN tag includes an operation code (opcode) field to contain an opcode and an equipment identifier field to contain an equipment identifier and wherein the third VLAN tag further includes a tag protocol field, a priority field, and a canonical format indicator field.

2. The method of claim 1 wherein the packet is an ingress packet from an Ethernet service unit (ESU) to an Ethernet routing switch (ERS).

3. The method of claim 1 wherein the second VLAN tag includes a port identifier field to contain a port identifier.

4. The method of claim 1 wherein the second VLAN tag further includes a tag protocol field, a priority field, and a canonical format indicator field.

5. The method of claim 1 wherein said equipment identifier specifies a particular Ethernet Service Unit (ESU) implementing an Ethernet Service Unit ring.

6. A method comprising:
  stripping a third virtual local area network (VLAN) tag from a Q-in-Q-in-Q packet prepended with first, second, and third VLAN tags to result in a Q-in-Q packet when the Q-in-Qin-Q packet is forwarded from a first port to a second port, the second port having output connected to input of a third port; and
  stripping the second VLAN tag from the Q-in-Q packet when the Q-in-Q packet is forwarded from the third port to a fourth port, wherein the third VLAN tag includes an operation code (opcode) field to contain an opcode and an equipment identifier field to contain an equipment identifier and wherein the third VLAN tag further includes a tag protocol field, a priority field, and a canonical format indicator field.

7. The method of claim 6 wherein the Q-in-Q-in-Q packet is an egress packet from an Ethernet routing switch (ERS) to an Ethernet service unit (ESU).

8. The method of claim 6 wherein the second VLAN tag includes a port identifier field to contain a port identifier.

9. The method of claim 6 wherein the second VLAN tag further includes a tag protocol field, a priority field, and a canonical format indicator field.

10. An article of manufacture comprising:
  a non-transitory machine-accessible storage medium including information that, when accessed by a machine, cause the machine to perform operations comprising:
    prepending a second virtual local area network (VLAN) tag to a packet prepended with a first VLAN tag when the packet is forwarded from a first port to a second port to result in an Qin-Q packet, the second port having output connected to input of a third port; and
    prepending a third VLAN tag to the Q-in-Q packet when the Q-in-Q packet is forwarded from the third port to a fourth port to result in an Q-in-Q-in-Q packet, wherein the third VLAN tag includes an operation code (opcode) field to contain an opcode and an equipment identifier field to contain an equipment identifier and wherein the third VLAN tag further includes a tag protocol field, a priority field, and a canonical format indicator field.

11. The article of manufacture of claim 10 wherein the packet is an ingress packet from an Ethernet service unit (ESU) to an Ethernet routing switch (ERS).

12. The article of manufacture of claim 10 wherein the second VLAN tag includes a port identifier field to contain a port identifier.

13. The article of manufacture of claim 10 wherein the second VLAN tag further includes a tag protocol field, a priority field, and a canonical format indicator field.

14. The article of manufacture of claim 10 wherein said equipment identifier specifies a particular Ethernet Service Unit (ESU) implementing an Ethernet Service Unit ring.

15. An article of manufacture comprising:
  a non-transitory machine-accessible storage medium including information that, when accessed by a machine, cause the machine to perform operations comprising:
    stripping a third virtual local area network (VLAN) tag from a Q-in-Q-in-Q packet prepended with first, second, and the third virtual VLAN tags to result in a Q-in-Q packet when the Q-in-Q-in-Q packet is forwarded from a first port to a second port, the second port having output connected to input of a third port; and
    stripping the second VLAN tag from the Q-in-Q packet when the Q-in-Q packet is forwarded from the third port to a fourth port, wherein the third VLAN tag includes an operation code (opcode) field to contain an opcode and an equipment identifier field to contain an equipment identifier and wherein the third VLAN tag further includes a tag protocol field, a priority field, and a canonical format indicator field.

16. The article of manufacture of claim 15 wherein the Q-in-Q-in-Q packet is an egress packet from an Ethernet routing switch (ERS) to an Ethernet service unit (ESU).

17. The article of manufacture of claim 15 wherein the second VLAN tag includes a port identifier field to contain a port identifier.

18. The article of manufacture of claim 15 wherein the second VLAN tag further includes a tag protocol field, a priority field, and a canonical format indicator field.

19. An apparatus comprising:
a first prepender to prepend a second virtual local area network (VLAN) tag to a packet prepended with a first VLAN tag when the packet is forwarded from a first port to a second port to result in an Q-in-Q packet, the second port having output connected to input of a third port; and
a second prepender to prepend a third VLAN tag to the Q-in-Q packet when the Q-in-Q packet is forwarded from the third port to a fourth port to result in an Q-in-Q-in-Q packet, wherein the third VLAN tag includes an operation code (opcode) field to contain an opcode and an equipment identifier field to contain an equipment identifier and wherein the third VLAN tag further includes a tag protocol field, a priority field, and a canonical format indicator field.

20. The apparatus of claim 19 wherein the packet is an ingress packet from an Ethernet service unit (ESU) to an Ethernet routing switch (ERS).

21. The apparatus of claim 19 wherein the second VLAN tag includes a port identifier field to contain a port identifier.

22. The apparatus of claim 19 wherein the second VLAN tag further includes a tag protocol field, a priority field, and a canonical format indicator field.

23. The apparatus of claim 19 wherein said equipment identifier specifies a particular Ethernet Service Unit (ESU) implementing an Ethernet Service Unit ring.

24. An apparatus comprising:
a first stripper to strip a third virtual local area network (VLAN) tag from a Q-in-Q-in-Q packet prepended with first, second, and third VLAN tags to result in a Q-in-Q packet when the Q-in-Q-in-Q packet is forwarded from a first port to a second port, the second port having output connected to input of a third port; and
a second stripper to strip the second VLAN tag from the Q-in-Q packet when the Q-in-Q packet is forwarded from the third port to a fourth port, wherein the third VLAN tag includes an operation code (opcode) field to contain an opcode and an equipment identifier field to contain an equipment identifier and wherein the third VLAN tag further includes a tag protocol field, a priority field, and a canonical format indicator field.

25. The apparatus of claim 24 wherein the Q-in-Q-in-Q packet is an egress packet from an Ethernet routing switch (ERS) to an Ethernet service unit (ESU).

26. The apparatus of claim 24 wherein the second VLAN tag includes a port identifier field to contain a port identifier.

27. The apparatus of claim 24 wherein the second VLAN tag further includes a tag protocol field, a priority field, and a canonical format indicator field.

28. A system comprising:
an Ethernet routing switch (ERS) to route packets, the packets including a Q-in-Q-in-Q packet having prepended with first, second, and third virtual local area network (VLAN) tags; and
a plurality of Ethernet service units (ESUs) coupled to the ERS to receive and transmit the packets, at least one of the plurality of the ESUs having a Q-in-Q-in-Q processing module, the Q-in-Q-in-Q processing module comprising:
a prepending module to prepend the second and third VLAN tags to a packet prepended with the first VLAN tag to result in the Q-in-Q-in-Q packet to forward to the ERS, and
a stripping module to strip the second and third VLAN tags from the Q-in-Q-in-Q packet received from the ERS, wherein the third VLAN tag includes an operation code (opcode) field to contain an opcode and an equipment identifier field to contain an equipment identifier and wherein the third VLAN tag further includes a tag protocol field, a priority field, and a canonical format indicator field.

29. The system of claim 28 wherein the prep ending module comprises:
a first prepender to prepend the second VLAN tag to the packet when the packet is forwarded from a first port to a second port to result in an Q-in-Q packet, the second port having output connected to input of a third port; and
a second prepender to prepend the third VLAN tag to the Q-in-Q packet when the Q-in-Q packet is forwarded from the third port to a fourth port to result in the Q-in-Q-in-Q packet.

30. The system of claim 28 wherein the stripping module comprises:
a first stripper to strip the third VLAN tag from the Q-in-Q-in-Q packet to result in a Qin-Q packet when the Q-in-Q-in-Q packet is forwarded from a first port to a second port, the second port having output connected to input of a third port; and
a second stripper to strip the second VLAN tag from the Q-in-Q packet when the Q-in-Q packet is forwarded from the third port to a fourth port.

31. The system of claim 28 wherein the Q-in-Q-in-Q packet is an ingress packet from the ESU to the ERS.

32. The system of claim 28 wherein the Q-in-Q-in-Q packet is an egress packet from the ERS to the ESU.

33. The system of claim 28 wherein the second VLAN tag includes a tag protocol field, a priority field, and a canonical format indicator field.

* * * * *